United States Patent [19]
Toyama et al.

[11] 4,157,866
[45] Jun. 12, 1979

[54] MOTION PICTURE CAMERA

[75] Inventors: Masamichi Toyama; Tomoshi Takigawa, both of Machida; Hideto Iwama, Kawasaki, all of Japan

[73] Assignee: Canon Kabushiki Kaisha, Tokyo, Japan

[21] Appl. No.: 841,448

[22] Filed: Oct. 12, 1977

[30] Foreign Application Priority Data
Oct. 14, 1976 [JP] Japan ................................ 51/123183

[51] Int. Cl.² .............................................. G03B 1/60
[52] U.S. Cl. ..................................... 352/171; 352/174
[58] Field of Search ............... 352/170, 171, 174, 175, 352/176, 177, 178, 179

[56] References Cited
U.S. PATENT DOCUMENTS

| 3,722,989 | 3/1973 | Inoue | 352/177 |
| 3,950,775 | 4/1976 | Toyama et al. | 352/171 |

Primary Examiner—Monroe H. Hayes
Attorney, Agent, or Firm—Toren, McGeady and Stanger

[57] ABSTRACT

A motion picture camera provided with a device which ensures satisfactory film exposure by cutting off unnecessary electric power supply to an electrical circuit of an information indicating lamp or the like in response to a camera setting action made to allow the camera to operate even after the operator thereof moves away from the camera.

21 Claims, 11 Drawing Figures

MOTION PICTURE CAMERA

BACKGROUND OF THE INVENTION

1. Field of the Invention

This invention relates to a motion picture camera.

2. Description of the Prior Art

There are some occasions where a motion picture camera operator steps away from the camera while leaving it operating for a long period of time. Such occasions include, for example, some cases where an operator joins a photographing object leaving a motion picture camera in a state of having its shutter release button kept depressed (usually called "a running lock condition"); an interval timer is connected to the camera for unattended photographing; a remote operation of the camera; etc.

Nowadays films and cameras have been improved to permit taking a photograph of an extremely dark object. However, when photographing is made in a dark place, information on the film supply condition, etc. which is clearly visible inside a view finder in photographing in a bright place becomes hardly visible thus necessitating illumination of such information with a lamp or the like to facilitate sighting thereof. However, such a lamp or the like is required only when photographing is to be accomplished by an operator while he is looking into a view finder. It is undesirable to have such a lamp kept alight while the camera is left unattended by the operator thereof and is contrary to an effort to make a smaller battery usable over a long period of time for use in a compact camera.

For the motion picture cameras of the type arranged to indicate information inside a view finder by the aid of lamp illumination, therefore, there has been provided a switch for cutting off electric power supply to such an indication lamp for economical use of power when the camera is to be left unattended by an operator while it is kept in a photographing condition. However, such a switch is independently arranged in a camera and, after setting the camera, the operator thereof sometimes forgets to turn off the switch. This presents another problem.

SUMMARY OF THE INVENTION

An object of this invention is to provide a novel motion picture camera which solves the above stated problems of the conventional motion picture cameras.

Another object of this invention is to provide a motion picture camera equipped with a device which cuts off electric power supply to an electric circuit of a lamp or the like provided for indication of view finder information in response to a camera setting action made to allow the camera to operate even after the operator of the camera has stepped away therefrom.

Still another object of this invention is to provide a motion picture camera which is arranged in such a manner that, after a shutter release switch button is depressed and locked in its operative state, when the switch is released from its depressed condition, electric power supply to an electric circuit of a lamp or the like provided for indicating view finder information is cut off.

A further object of this invention is to provide a motion picture camera wherein electric power supply to an electrical circuit of a lamp or the like provided for indication of view finder information is cut off when a plug of an accessory to be attached to the camera from outside is inserted into a shutter of the camera.

These and other objects, advantages and features of this invention will become more apparent from the following description of preferred embodiments thereof when read in connection with the accompanying drawings.

DESCRIPTION OF THE PREFERRED EMBODIMENT

The motion picture camera of this invention is described hereinafter with reference to the accompanying drawings.

Figure 1:
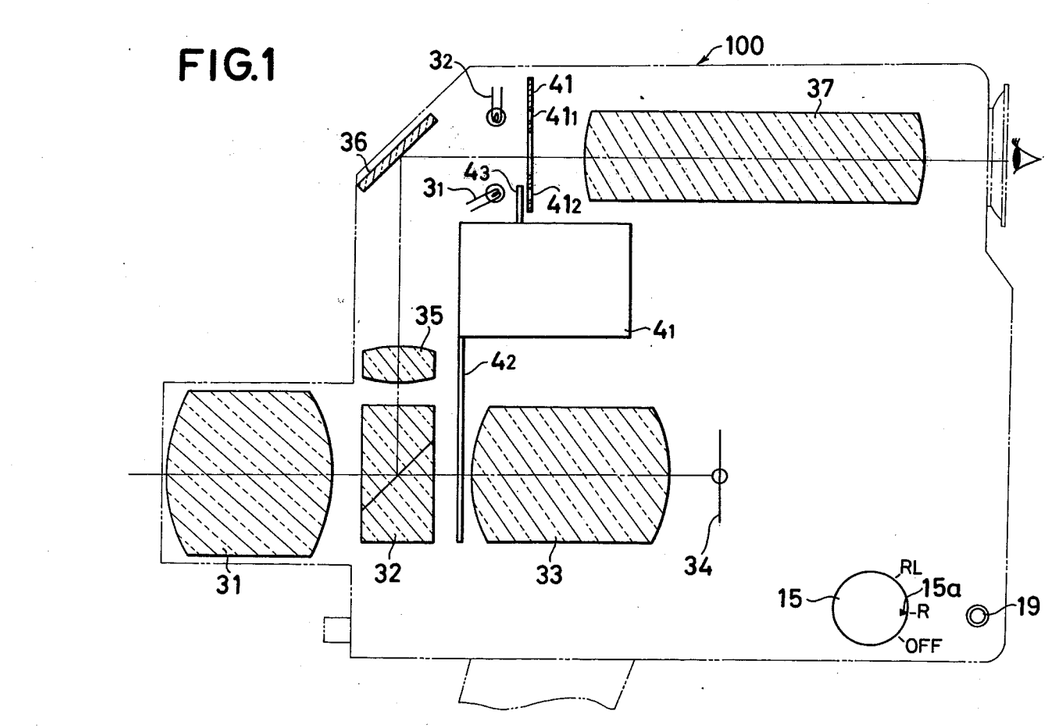
FIG. 1 is a schematic diagram illustrating arrangement of a photographing optical system, a view finder optical system, view finder information indicating means, etc. in a motion picture camera as an embodiment of this invention.
Figure 2:
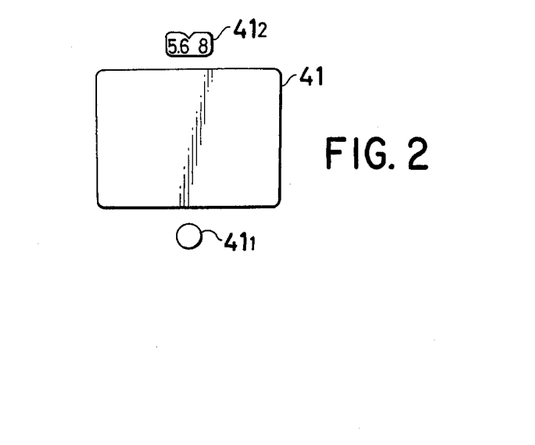
FIG. 2 is a plan view illustrating a condition of the inside of a view finder of the motion picture camera of FIG. 1 as it appears to the eye when an operator looks into the view finder.
Figure 3A:
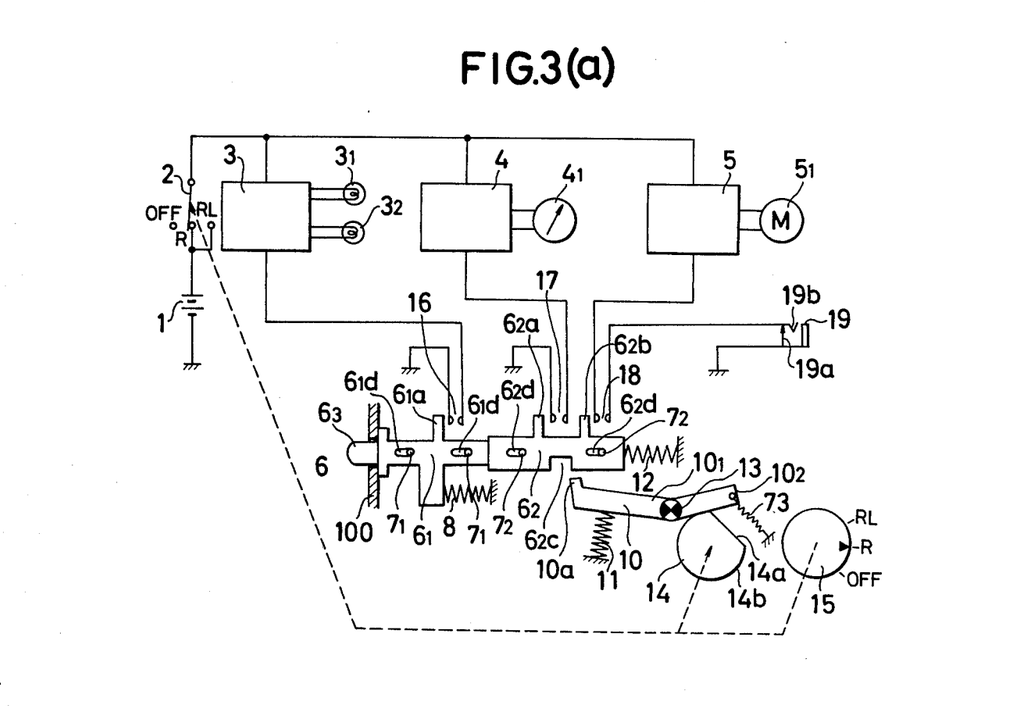
FIG. 3(a) is a schematic diagram illustrating the camera as in a state of having been prepared for photographing but with a shutter release button not having been depressed as yet.
Figure 3B:
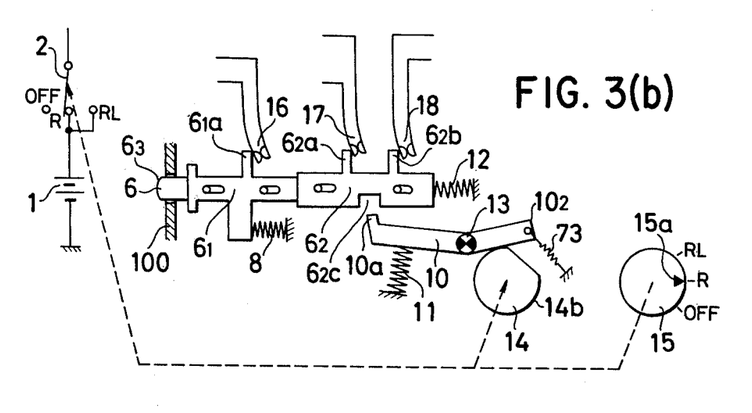
FIG. 3(b) illustrates it as in a state where the release button is being depressed.
Figure 3C:
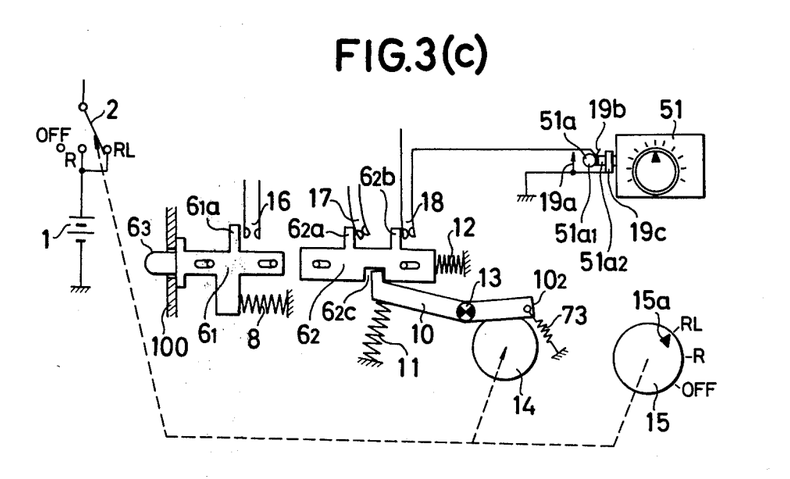
FIG. 3(c) illustrates it as in a state where an interval timer has been mounted on the camera and a running lock action has been taken.

In FIG. 1 through FIG. 3, a reference numeral 100 indicates a camera body; 31 indicates a zoom optical system; 33 indicates a relay optical system; 35 indicates an objective lens system; 37 indicates a view finder lens system; 36 indicates a total reflection mirror which is arranged to cause a light passing through the objective lens system to be incident upon the view finder lens system 37; 32 indicates a half mirror which divides a light passing through the zoom optical system 31 between the relay lens system 33 and the objective lens system 35; 34 indicates a film plane on which a film is to be disposed; 51 indicates an exposure meter which is controlled by an exposure circuit 4; 42 indicates a lens stop blade assembly; 43 indicates a stop value indicating plate which moves in response to the output of the exposure meter 51; and 41 indicates a view finder mask plate, which is provided with a window $41_1$ for confirmation of film feeding and another window $41_2$ for indicating a stop value, the above stated stop value indicating plate 43 being disposed at a position corresponding to the stop value indicating window $41_2$. A reference numeral 31 indicates a lamp which is disposed at a position corresponding to the stop value indicating plate 43 to illuminate it; and 32 indicates a lamp which is provided for indication of a film feeding condition. With an optical system arrangement made as illustrated in FIG. 1, when an operator looks into the view finder, a stop value of the lens stop 42 obtained under control is observable through the stop value indicating window $41_2$ of the finder mask plate 41 and, concurrently with that, the film feeding condition also can be observed through the film feeding condition checking window $41_1$. A numeral 15 indicates a shutter release selection knob, which is rotatably connected to the camera body 100. A pointer 15a is provided on the knob 15 for selection with it of one of the three positions "OFF", "R" and "RL" arranged round the knob 15. A numeral 14 indicates a cam member arranged coaxially with the shutter release selection knob 15 to rotate in response to the operation of the knob 15. The cam member 14 is provided with a cut-away part 14a. A reference numeral 1 indicates a power source battery; and 2 indicates a main switch. The main switch 2 is interlocked with the shutter release selection knob for selective operation thereof. The main switch 2 is in its OFF position when the pointer 15a of the knob 15 points the "OFF" position thereof; is short circuited to a contact R when the pointer 15a of the knob 15 is set in the "R" position thereof; and is short circuited to a contact RL when the pointer 15a points the "RL" position of the knob 15. A numeral 3 indicates an information indicating circuit which consists of a circuit for lighting the lamp 31 and another circuit for leaving the lamp 32 alight while the film is under a film feeding operation. The information indicating circuit is a known circuit. A reference numeral 4 indicates an exposure control circuit which is a known circuit and is provided for controlling the above stated exposure meter according to the brightness of an object being photographed; 5 indicates a motor driving circuit which is a known circuit and is provided for controlling a driving motor $5_1$ which is provided for driving a film feeding mechanism; 16 indicates a switch provided for controlling the information indicating circuit 3; 17 indicates a switch provided for controlling the exposure control circuit 4; 18 indicates another switch which is provided for controlling the motor driving circuit 5; and 19 indicates a jack to which a plug 51a of an interval timer 51 shown in FIG. 3(c) or a plug of an unillustrated remote control device is to be connected. The jack 19 permits an interval photographing operation with the plug 51a of the interval timer 51 connected thereto and a remote controlled photographing operation with the plug of the remote control device connected thereto. For such interval photographing or remote controlled photographing, however, the switches 17 and 18 must be turned on respectively. A numeral 6 indicates a shutter release button device, which is composed of a release button $6_3$, a first release plate $6_1$ and a second release plate $6_2$. The first release plate $6_1$ is provided with a first protrudent part $6_{1a}$, a second protrudent part $6_{1b}$, a third protrudent part $6_{1c}$ and two slots $6_{1d}$. Pins 71 which are planted in the camera body 100 are arranged to engage with the slots $6_{1d}$ of the first release plate $6_1$ so that the first release plate $6_1$ can be guided by the pins 71 and is thus slidable in the longitudinal direction of the slots $6_{1d}$. The release button $6_3$ is secured to one end of the first release plate $6_1$. A reference numeral 8 indicates a compression spring which is connected to the camera body 100 at one end thereof and to the second protrudent part $6_{1b}$ of the first release plate $6_1$ at the other end to urge the first release plate $6_1$ to move to the left as viewed in FIG. 1 and FIG. 3. When the shutter release button 6 is depressed from the outside of the camera to push the first release plate $6_1$ to the right as viewed in FIG. 1 and FIG. 3, the switch 16 is disposed to be closed by the third protrudent part $6_{1c}$ of the release plate $6_1$. The second release plate $6_2$ is provided with a first protrudent part $6_{2a}$, a second protrudent part $6_{2b}$, a cut-away part $6_{2c}$, and two slots $6_{2d}$. Pins 72 which are planted in the camera body 100 are arranged to engage with the slots $6_{2d}$ of the second release plate $6_2$ to make the second release plate $6_2$ slidable in the longitudinal direction of these slots $6_{2d}$. A reference numeral 12 indicates a compression spring which is connected to the camera body at one end thereof and to the second release plate $6_2$ at the other end to urge the second release plate to move to the left as viewed in FIG. 1 and FIG. 3. The relation between the first and second release plates $6_1$ and $6_2$ is as follows: When the shutter release button $6_3$ is depressed from the outside of the camera to push the first release plate $6_1$ to the right as viewed in FIG. 3, the first release plate $6_1$ and the second release plate $6_2$ are caused to engage with each other so that the second release plate $6_2$ is caused also to move to the right by the first release plate $6_1$. Further, when the second release plate $6_2$ is moved to the right, the switches 17 and 18 are respectively closed by the first protrudent part $6_{2a}$ and the second protrudent part $6_{2b}$ of the second release plate $6_2$. A reference numeral 10 indicates a release lock member rotatably supported by a pin 13 planted in the camera body 100. The release lock member 10 is constantly urged to rotate clockwise by springs 11 and 73 which are connected to the ends $10_1$ and $10_2$ of the release lock member 10 respectively. This maintains the release lock member in contact with the cam face of the cam member 14. The motion picture camera which is constructed in accordance with this invention as described in the foregoing operates in the following manner:

When the pointer 15a of the release selection knob 15 is set in the "OFF" position, the cam face 14b of the cam member 14 is in a position to be in contact with the release lock member 10 to urge it to rotate counterclockwise against the clockwise urging force of the compression spring 11 while the main switch 2 is in its off position.

When the pointer 15a of the shutter release selection knob 15 is shifted from the "OFF" position to the "R" position, the main switch 2 is short circuited to the contact R in response to the operation of the knob 15 while the cam member 14 is also caused to rotate in response to the knob operation. Under such a condition, the cam face 14b of the cam member 14 is in contact with the release lock member 10 and is thus urging the release lock member 10 to rotate counterclockwise against the clockwise urging force of the compression spring 11. This condition is as illustrated in the FIG. 3(a).

Under such a condition, when the release button $6_3$ is pushed in the direction of arrow, the first and second release plates $6_1$ and $6_2$ are moved to the right; the switches 16, 17 and 18 are closed in sequence in the order of 17, 16 and 18; and the information indicating circuit 3, exposure control circuit 4 and motor driving circuit 5 are put in their operating condition and a photographing operation commences. FIG. 3(b) represents such conditions. Under such conditions, the lamp 31 is lighted to allow a person looking into the view finder to easily see the stop value indicating plate 43 and, when the film feeding condition is normal, the lamp 32 also lights up to inform the operator looking into the view finder of the normal film feeding condition. When the release button $6_3$ is relieved from the above stated depressing force, the compression springs 8 and 12 cause the first and second release plates $6_1$ and $6_2$ to come back to their original positions as shown in FIG. 3(a) and the photographing operation is completed.

In the next place, when the pointer 15a of the shutter release selection knob 15 is shifted from the "R" position to the "RL" position, the main switch 2 is connected to the contact RL in response to the shifting operation. Concurrently with this, the cam member 14 comes to further rotate also in response to the shifting operation until it comes into contact with the release lock member 10. Accordingly, the release lock member 10 is rotated clockwise by the urging force of the compression spring 11 as much as the cut-away portion of the cam face 14a of the cam member 14; and then the engaging part 10a of the release lock member 10 is kept in a state of being in contact with the second release plate $6_2$. Under such a condition, when the shutter release button $6_3$ is pushed to the right as viewed in FIG. 3, the first and second release plates $6_1$ and $6_2$ are moved to the right. Then, when the cut-away part $6_{2c}$ of the release plate $6_2$ comes to a position corresponding to the engaging part 10a of the release lock member 10, the cut-away part $6_{2c}$ engages with the engaging part 10a of the release lock member 10. By this, the switches 16, 17 and 18 are brought into their closed states and a photographing operation begins. The switch 16 remains in its closed state until the release button $6_3$ is relieved from depression and, in the meantime, both the lamps 31 and 32 are kept alight. When the release button $6_3$ is relieved from depression, the urging force of the compression spring 8 causes the first release plate $6_1$ to move to the left to bring the switch 16 into its open state and the lights of the lamps 31 and 32 are put out thereby. Meanwhile, however, the second release plate $6_2$ still remains in engagement with the release lock member 10, even after the removal of the depression force from the release button $6_3$, so that the switches 17 and 18 are retained in their closed state to continue the photographing operation. This condition is represented by FIG. 3(c). To discontinue the photographing operation, the pointer 15a of the selection knob 15 is shifted from the "RL" position to "R" position. Then, in response to the shifting operation, the cam 14 rotates to bring the cam face 14b into a position to contact with the release lock member 10. This causes the release lock member to rotate counterclockwise to disengage from the second release plate $6_2$. With the second release plate $6_2$ disengaged from the release lock member 10, the urging force of the compression spring 12 causes the second release plate $6_2$ to move to the left to bring the switches 17 and 18 into their open states and the photographing operation comes to a stop. FIG. 1 represents this condition.

The above mentioned operation, with the pointer 15a of the knob 15 set in the "RL" position takes place when the plug of an interval timer 51 or a remote control device is not connected to the jack 19, i.e. under a condition where the contact 19a of the jack 19 is not connected to the contact 19b. The following description covers an operation that takes place when the plug 51a of the interval timer 51 is connected to the jack 19; With the pointer 15a of the release selection knob 15 left in its "OFF" position, when the plug 51a of the interval timer 51 is inserted into the jack 19, the contacts 19a and 19b of the jack 19 are disconnected from each other. Then, the contact $51a_1$ of the plug 51a is connected to the contact 19b of the jack 19 and then the contact $51a_2$ of the plug 51a is connected to the contact 19c of the jack 19 as shown in FIG. 3(c). The short circuiting between the contacts 19a and 19b of the jack 19 then can be effected through the operation of a switch provided in the interval timer 51. Then, with the pointer 15a of the release selection knob 15 shifted from the "OFF" position to the "RL" position through the "R" position, when the shutter release button $6_3$ is pushed to the right as viewed in FIG. 3, the first and second release plates $6_1$ and $6_2$ are caused thereby to move to the right. Then, when the cut-away part $6_{2c}$ of the second release plate $6_2$ comes to a position corresponding to the engaging part 10a of the release lock member 10 in the same manner as before, the engaging part 10a of the release lock member 10 engages with the cut-away part $6_{2c}$ of the second release plate $6_2$. Under such a condition, the switches 16, 17 and 18 are brought into their closed states, the switch 16 being pressed by the protrudent part $6_{1a}$ of the first release plate $6_1$, the switch 17 being pressed by the protrudent part $6_{2a}$ of the second release plate $6_2$ and the switch 18 by the protrudent part $6_{2b}$ of the second release plate $6_2$, and the interval timer 51 begins to operate. Under this condition, when the release button $6_3$ is relieved from the pushing force, the urging force of the compression spring 8 causes the first release plate $6_1$ to move to the left to bring the switch 16 into an open state. This cuts off the electric power supply to the information indicating circuit 3 to put out the lights of the lamps 31 and 32. Meanwhile, the second release plate $6_2$ remains in engagement with the release lock member 10 even after removal of the pushing force from the release button $6_3$. Therefore, the switches 17 and 18 remain in their closed states to have the exposure control circuit 4 in a normal energized state and to intermittently supply an electric power to the motor driving circuit 5 through the interval timer 51 for interval photographing. Further, when a plug of a known remote control device is connected in place of the interval timer 51, a photographing operation is carried out under control by the remote control device. In this particular embodiment example, when it is desired to see the lens stop value, etc., the release button $6_3$ is pushed to close the switch 16 to energize the information indicating circuit 3 so that the circuit 3 can be made to temporarily operate. Further, it is possible to arrange the switch 16 to be capable of returning the first release plate $6_1$ to the left and to arrange the switches 17 and 18 to be capable of returning the second release plate $6_2$ to the left by a spring action respectively after the release button $6_3$ is relieved from the pushing force exerted thereon. Then such arrangement dispenses with the use of springs 8 and 12. Such arrangement is also applicable to the embodiment examples illustrated in FIGS. 4 through 7.

Figure 4A:
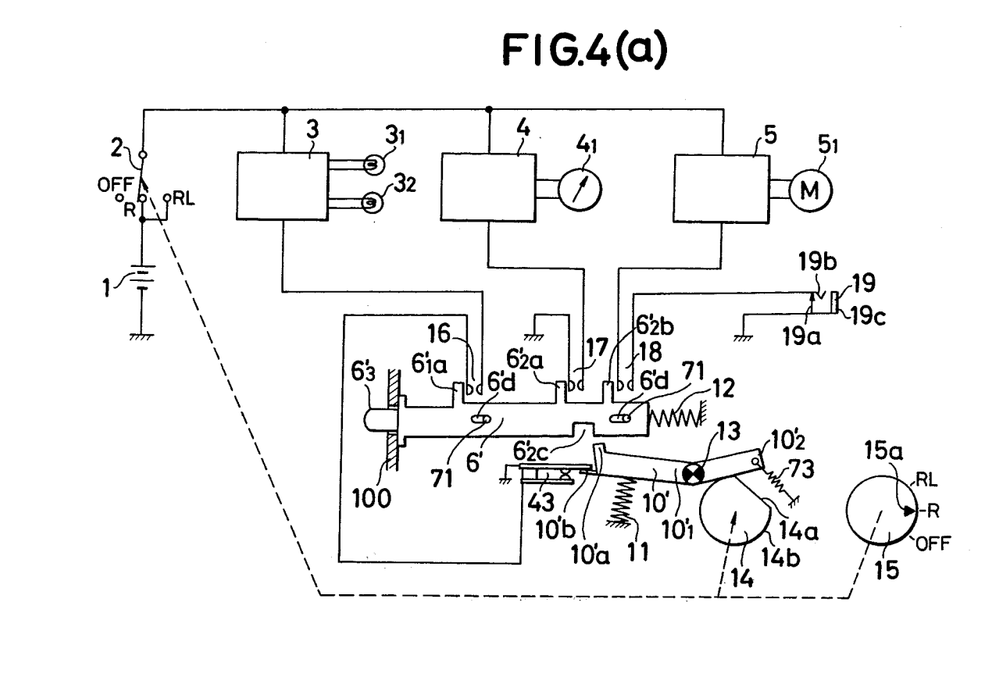
FIGS. 4(a) and (b) are schematic diagrams illustrating a modification of the first embodiment shown in FIG. 3 as a second embodiment of the invention, FIG. 4(a) illustrating the camera as in a state of having been set to be ready for photographing and with a shutter release button not depressed and FIG. 4(b) illustrating the camera as in a state where a running lock action has been taken.
Figure 4B:
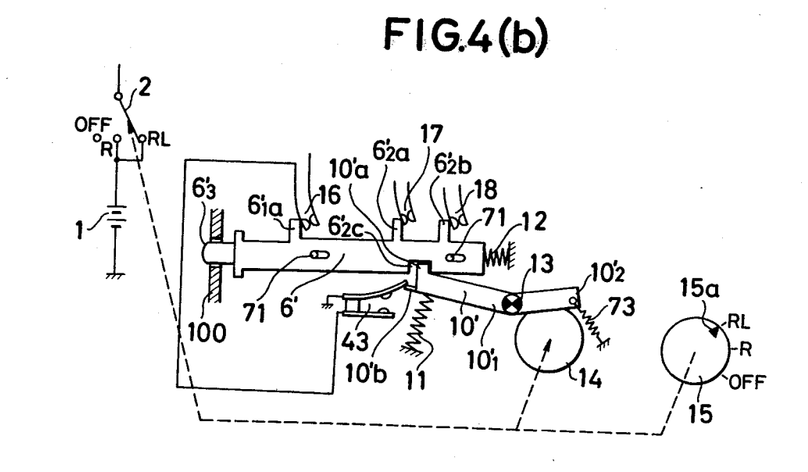

FIG. 4 is a schematic diagram illustrating a motion picture camera as a second embodiment of this invention. In FIG. 4, the same reference numerals as in FIG. 3 are used to indicate identical parts with those shown in FIG. 3. Therefore, the following description covers parts that are different from those shown in FIG. 3. A reference numeral 10' indicates a release lock member which is rotatably set on a pin 13 which is planted in the camera body 100. The ends 10'$_1$ and 10'$_2$ of the release lock member 10' are constantly urged by springs 11 and 73 to rotate clockwise and the release lock member 10' is constantly pressed into contact with the cam face of a cam member 14. A numeral 6' indicates a release member which corresponds to a combination of the first and second release plates 6$_1$ and 6$_2$ shown in FIG. 3. The release member 6' is provided with a first protrudent part 6'$_{1a}$, a second protrudent part 6'$_{2a}$, a third protrudent part 6'$_{2b}$, two slots 6'd, a cut-away part 6'$_{2c}$ and a release button 6'$_3$. A numeral 43 indicates a switch which is connected in series with the switch 16. The switch 43 is closed when the pointer 15a of the release selection knob 15 is in its "OFF" or "R" position. The switch 43 is brought into an opened state by a claw part 10'b under the condition as illustrated in FIG. 4(b) wherein the pointer 15a of the release selection knob 15 is in the "RL" position and the engaging part 10'a of the release lock member 10' is in engagement with the cut-away part 6'$_{2c}$ of the release member 6'.

The second embodiment of this invention constructed as described in the foregoing operates in the following manner: Under the condition as illustrated in FIG. 4(a), the pointer 15a of the release selection knob 15 is in the "R" position and the switch 43 is in a closed state. Under this condition, when a pushing force is exerted on the release button 6$_3$ to push the release member 6' to the right, the switch 16 is closed by the protrudent part 6'$_{1a}$ and the switch 17 by the protrudent part 6'$_{2a}$. Then, the switch 18 is closed by the protrudent part 6'$_{2b}$. This brings the information indicating circuit 3, the exposure control circuit 4 and the motor driving circuit 5 into their operating conditions to start a photographing operation. Under this condition, the lamp 3$_1$ lights up to permit easy observation of a lens stop value indicatng plate 4$_3$ by an operator who is looking into the view finder while, when the film feeding operation is normal, another lamp 3$_2$ also lights up to show the operator who is looking into the view finder that the film feeding operation is normal. Next, when the release button 6'$_3$ is relieved from the pushing force, the compression spring 12 causes the release member 6' to come back to its original position as shown in FIG. 4(a) and the photographing operation comes to a stop.

Following this, when the pointer 15a of the release selection knob 15 is shifted from the "R" position to "RL" position, the main switch 2 is connected to the contact RL in response to the shifting operation of the knob 15. Concurrently with this, the cam member 14 is further rotated by the shifting operation of the knob 15 and the cam face 14a comes into contact with the release lock member 10'. Accordingly, the urging force of the spring 11 causes the release lock member 10' to rotate clockwise as much as the cut-away part of the cam face 14a of the cam member 14 and the engaging part 10'a of the release lock member 10' is kept in a state of being in contact with the release member 6'. When the release button 6'$_3$ is pushed to the right under this condition as shown in FIG. 4, the release member is moved to the right. When the cut-away part 6'$_{2c}$ of the release member 6' comes to a position corresponding to the engaging part 10'a of the release lock member 10', the cut-away part 6'$_{2c}$ engages with the engaging part 10'a. The switches 16, 17 and 18 are closed under such a condition. However, when the engaging part 10'a of the release lock member 10' rotates to engage with the cut-away part 6'$_{2c}$ of the release lock member 6', this opens the switch 43 which is connected in series with the switch 16. Therefore, no electric current flows to the information indicating circuit 3 and an electric power is supplied only to the motor driving circuit 5 of the exposure control circuit 4.

Further, when the plug of an interval timer 51 or that of the remote control device is inserted into the jack 19, there takes place the same operation as described in the foregoing with reference to FIG. 3.

Figure 5A:
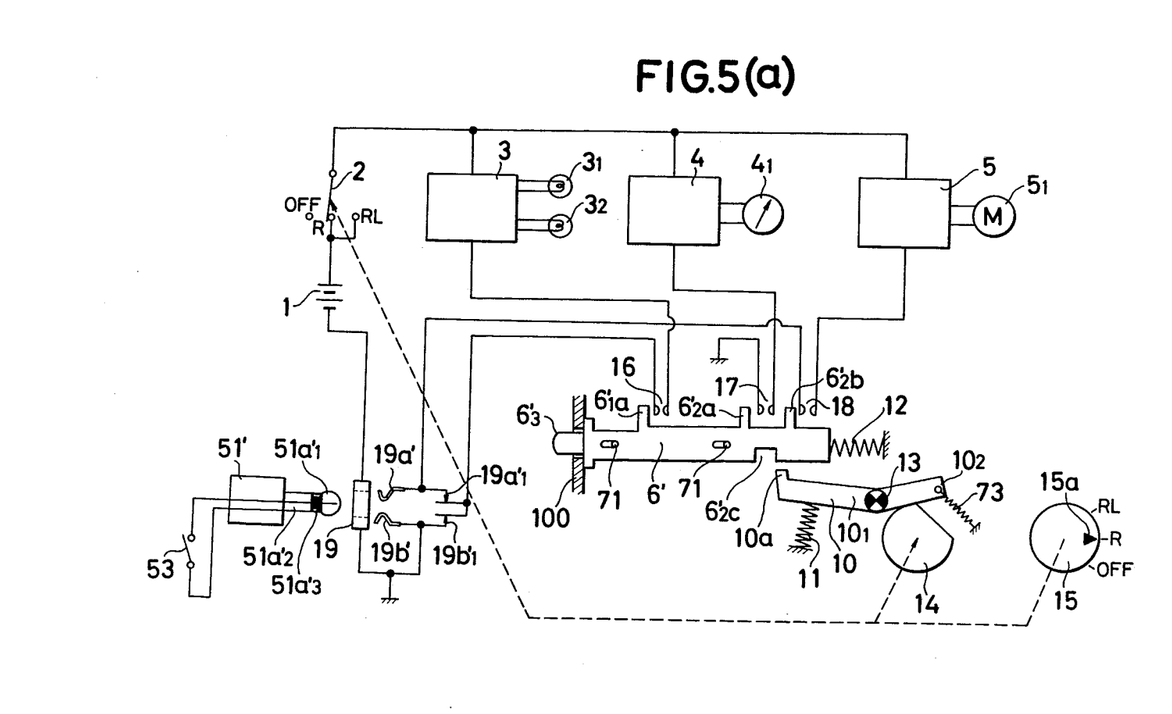
FIGS. 5(a) and (b) are schematic diagrams illustrating a motion picture camera as a third embodiment of the invention, FIG. 5(a) illustrating the camera as in a state of having been set to be ready for photographing and with a shutter release button not depressed and FIG. 5(b) illustrating the camera as having a remote control device connected thereto and as in a state where a running lock action has been taken.
Figure 5B:
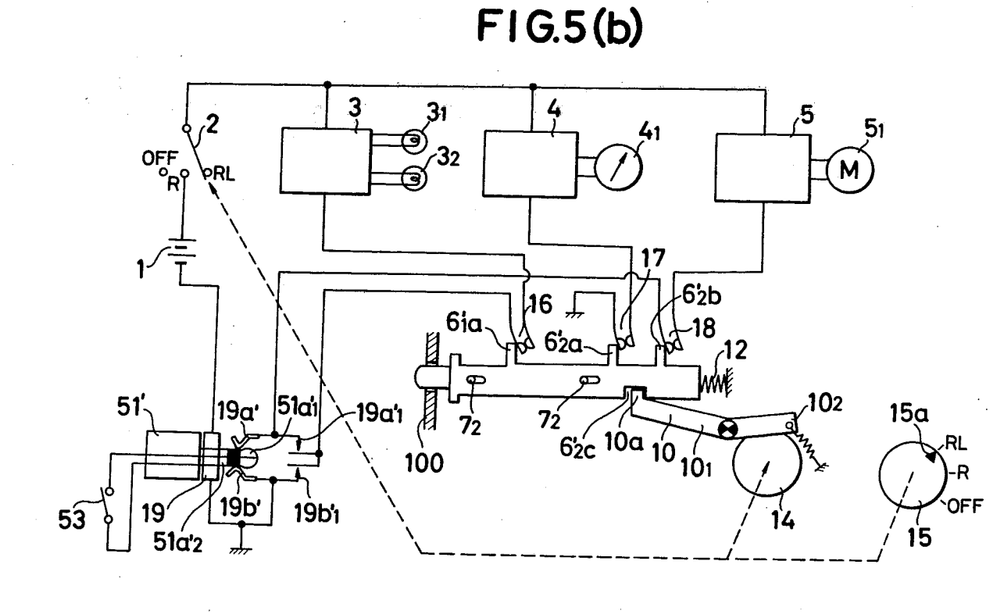

FIG. 5 is an illustration of a third embodiment of this invention which is a further modification of the embodiments shown in FIG. 3 and FIG. 4. The same reference numerals as those used in FIG. 3 and FIG. 4 are used for indicating like parts. The following description, therefore, covers the parts that differ from those shown in FIG. 3 and FIG. 4. In FIG. 5, a reference numeral 51' indicates a plug of a remote control device. The plug 51' comprises conductive parts 51a'$_1$ and 51a'$_2$ and an insulating part 51a'$_3$. A reference numeral 53 indicates a remote switch; 19a' indicates a conductive contact piece connected in series with the switch 18 and 19b' an insulating contact piece. In the embodiment as illustrated in FIG. 5, when the plug 51' is not inserted in the jack 19 while the pointer 15a of the release selection knob 15 is set in the "R" position, pushing the release button 6'$_3$ causes the release member 6' to move to the right as viewed in FIG. 5. Then, switches 16, 17 and 18 are closed by the protruding parts 6'$_{1a}$, 6'$_{2a}$ and 6'$_{2b}$ of the release member 6'. Under this condition, the electric current of the power source 1 flows in a path consisting of the (+) terminal of the power source 1 - contact R - main switch 2 - information indicating circuit 3 - switch 16 - contact 19b'$_1$ - shutter 19 - (−) terminal of power source 1; a path of the (+) terminal of power source 1 - contact R - main switch 2 - exposure control circuit 4 - switch 17 - ground; and another path of the (+) terminal of the power source 1 - contact R - main switch 2 - motor driving circuit 5 - switch 18 - contact 19a'$_1$ - jack 19 - (−) terminal of power source 1. The information indicating circuit 3, the exposure control circuit 4 and the motor driving circuit 5 are all activated by the electric current of the power source 1. Under this condition, the lamps 3$_1$ and 3$_2$ light up to enable an operator of the camera looking into the view finder to easily see the lens stop value indicating plate 4$_3$ and see whether or not film feeding is accomplished in a normal condition. Then, when the release button 6'$_3$ is relieved from the pushing force exerted thereon, the urging force of the compression spring 12 causes the release member 6' to return to the left as viewed in FIG. 5 and all of the switches 16, 17 and 18 are brought into their opened state.

In cases where a remote controlled photographing operation or an interval photographing operation is to be made, the camera is operated in the following manner: For remote controlled photographing, the pointer 15a of the release selection knob 15 is set in the "RL" position. By this, the main switch is connected to the contact RL. When the remote control plug 51' is inserted into the jack 19, the contacts 51a'$_1$ and 51a'$_2$ of the plug 51' push the contacts 19a'$_1$ and 19b'$_1$ of the jack 19 into an opened state. The contact 19a' is electrically connected to the contact 51a'₁ while the jack 19 is connected to the contact 51a'₂. Although the contact 51a'₁ comes into contact with contact 19b', they are not electrically connected as the contact 19b' is an insulating contact piece. Therefore, with the plug 51' inserted into the jack 19, the information indicating circuit 3 is completely disconnected from the jack 19 and the power source 1 as the contacts 19a'₁ and 19b'₁ brought into an opened state. After insertion of the plug 51' into the jack 19 in this manner, when the release button 6'₃ is pushed to the right, the release member 6' is moved thereby to the right as viewed in FIG. 5 and the protrudent parts 6'₁ₐ, 6'₂ₐ and 6'₂ᵦ of the release member 6' bring the switches 16, 17 and 18 into their closed states respectively. Under this condition, the release member 6' is locked by the release lock member 10. In other words, under such a condition, the motor driving circuit 5 can be controlled by the remote switch 53 while the information indicating circuit 3 is left inoperative. In this case, the exposure control circuit 4 begins to operate when the switch 17 is closed by the release member 6'. Following this, when the remote switch 53 is closed, the current of the power source 1 flows through a path consisting of the (+) terminal of power source 1 - contact RL - motor driving circuit 5 - switch 18 - contact 19a' - contact 51a'₁ - remote switch 53 - contact 51a'₂ - jack 19 - (−) terminal of power source 1 to permit remote control over the motor driving circuit 5. Further, it will be readily understood that, in this embodiment, the same control can be accomplished as in the case of the remote control device when a plug of the interval timer 51 is connected as shown in FIG. 3(c).

Figure 6:
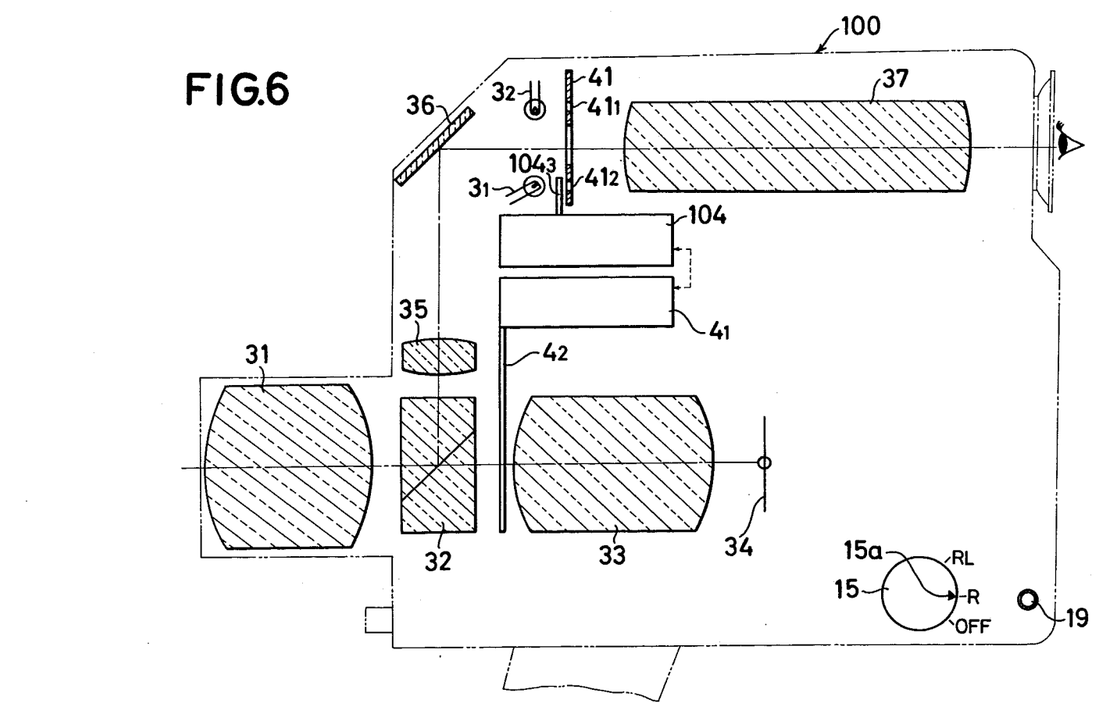
FIG. 6 is an illustration of another modification of the embodiment shown in FIGS. 1 and 3 as a fourth embodiment of the invention.
Figure 7:
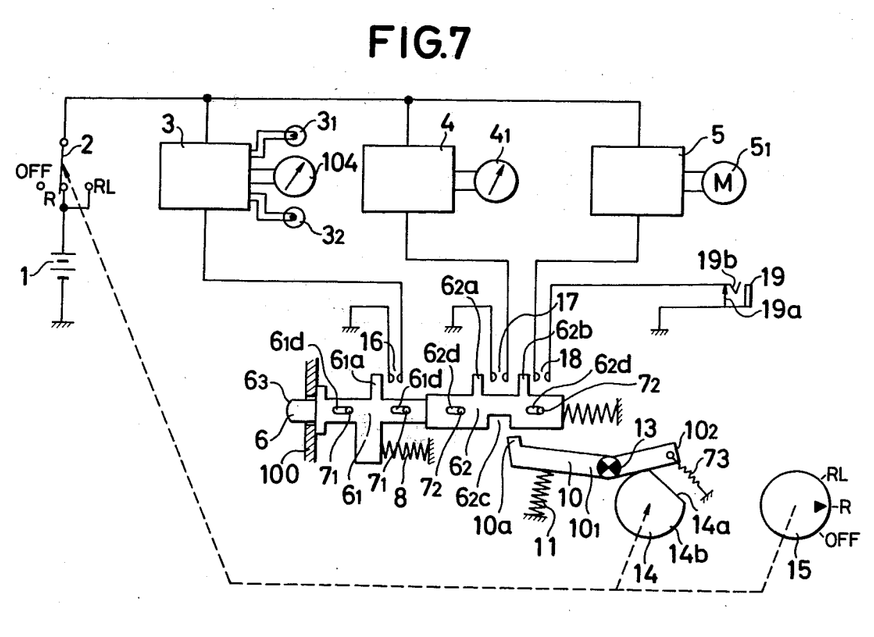
FIG. 7 is an illustration of details of the essential parts of the fourth embodiment shown in FIG. 6.

FIG. 6 illustrates another modification of the embodiment shown in FIGS. 1 and 3 showing the arrangement of a photographing optical system, a view finder optical system, a view finder information indicating means, etc. as a fourth embodiment of the invention. FIG. 7 illustrates the details of the essential parts of the motion picture camera shown in FIG. 6. The arrangement shown in FIGS. 6 and 7 differs from the embodiment shown in FIGS. 1 and 3 in that: In the case of FIGS. 1 and 3, the lens stop value indicating member 104₃ employed as view finder information indicating means is controlled by the exposure control circuit 4. Whereas, in the case of FIGS. 6 and 7, a control meter 104 is provided separately from an exposure meter 4₁ for controlling a lens stop value indicating member 104₃ in such a manner as to have it correlatively operates with the exposure meter 4₁. As exposure control information signal is supplied from the exposure control circuit 4 to the information indicating circuit 3. Then, in accordance with the exposure control information signal, the information indicating circuit 3 controls the control meter 104. In other words, in this embodiment example, the exposure meter 4₁ controls only a photographing light flux passing through a photographing optical system 31 and is not provided with any indicating means. The indication of a stop value is arranged to be performed by the stop value indicating member 104₃ of the control meter 104. With the exception of the above stated difference, the rest of the arrangement are identical with those shown in FIGS. 1 and 3 while the condition to be sighted inside the view finder is also identical with the condition illustrated in FIG. 2.

As detailed in the foregoing, in accordance with this invention, when the motion picture camera is set to operate while unattended by the operator, an electric power supply to electric circuits that are not directly participating in the photographing operation is arranged to be cut off in response to the above stated camera setting action. With such arrangement incorporated, therefore, a power saving type camera which is advantageous as it is free from unnecessary power consumption can be obtained.

What is claimed is:
1. A motion picture camera, comprising:
  (a) a camera housing;
  (b) an electric power supply circuit;
  (c) film feeding means driven by an electric current supplied from said electric power supply circuit for feeding film;
  (d) first switching means for making electric connection between said electric power supply circuit and said film feeding means, the electric connecting being normally cut off;
  (e) information indicating means operated by an electric current supplied from said electric power supply circuit to indicate the operating condition of the camera;
  (f) second switching means which makes electric connection between said electric power supply circuit and said information indicating means, the electric connection being normally cut off;
  (g) interlocking means for interlocking (1) a first control means shiftable between a position in which it actuates said second switching means to effect said electric connection and another position in which it releases the second switching means to cut off said electric connection with (2) a second control means shiftable between a position in which it actuates said first switching means to effect said electric connection and another position in which it releases said first switching means to cut off said electric connection, the first and second control means being arranged to move simultaneously or individually, the interlocking means being provided with first urging means which constantly urges said first control means toward its position in which it holds said second switching means in a state of cutting off said electric connection and with second urging means which constantly urges said second control means toward its position in which it holds said first switching means in a state of cutting off said electric connection; and
  (h) locking means which, against the urging force of said second urging means, selectively locks only said second control means in its position in which said first switching means is held in a state of effecting said electric connection.

2. A motion picture camera according to claim 1, wherein said information indicating means is provided with an indicating part disposed inside the visual field of a view finder.

3. A motion picture camera according to claim 2, wherein a lamp is disposed in said indicating part.

4. A motion picture camera according to claim 1, wherein said information indicating means indicates exposure stop value information.

5. A motion picture camera according to claim 1, wherein said information indicating means indicates the film feeding status of said film feeding means.

6. A motion picture camera according to claim 1, wherein said first switching means combines the function of said first urging means and said second switching means the function of said second urging means.

7. A motion picture camera of a TTL type comprising:
 (a) a camera housing;
 (b) a photographing optical system disposed inside the camera housing;
 (c) a view finder optical system disposed inside the camera housing;
 (d) an electric power supply circuit;
 (e) film feeding means driven by an electric current supplied from the electric power supply circuit for feeding film;
 (f) first switching means for making electric connection between the electric power supply circuit and said film feeding means, the electric connection being normally cut off;
 (g) information indicating means which is operated by the electric current supplied from the electric power supply circuit and which is provided with a movable member to be shifted within the visual field of the view finder optical system according to the operating status of the camera;
 (h) illuminating means for illuminating the movable member of the information indicating means for an improved effect of indication by the information indicating means inside the visual field of the view finder, the illuminating means being operated by an electric current supplied from the electric power supply circuit;
 (i) second switching means which at least makes electric connection between said electric power supply circuit and said information indicating means, the electric connection being normally cut off;
 (j) interlocking means for interlocking (1) a first control means shiftable between a position in which it actuates said second switching means to effect said electric connection and another position in which it releases the second switching means to cut off said electric connection with (2) a second control means shiftable between a position in which it actuates said first switching means to effect said electric connection and another position in which it releases said first switching means to cut off said electric connection, the first and second control means being arranged to move simultaneously or individually, the interlocking means being provided with first urging means which constantly urges said first control means toward its position in which it holds said second switching means in a state of cutting off said electric connection and with second urging means which constantly urges said second control means toward its position in which it holds said first switching means in a state of cutting off said electric connection; and
 (k) locking means which, against the urging force of said second urging means, selectively locks only said second control means in its position in which said first switching means is held in a state of effecting said electric connection.

8. A motion picture camera according to claim 7, wherein said information indicating means indicates a defining degree of a photographing light flux defining member which defines a photographing light flux passing through said photographing optical system.

9. A motion picture camera of a TTL type comprising:
 (a) a camera housing;
 (b) a photographing optical system disposed in the camera housing;
 (c) a view finder optical system disposed in the camera housing;
 (d) an electric power supply circuit;
 (e) film feeding means driven by an electric current supplied by the electric power supply circuit;
 (f) first switching means which makes electric connection between the electric power supply circuit and said film feeding means, the electric connection being normally cut off;
 (g) information indicating means which is operated by an electric current supplied from the electric power supply circuit and which is provided with an indicating part disposed within the visual field of the view finder optical system to indicate information according to the operating status of the camera;
 (h) second switching means which makes electric connection between said electric power supply circuit and said information indicating means, the electric connection being normally cut off;
 (i) interlocking means for interlocking (1) a first control means shiftable between a position in which it actuates said second switching means to effect said electric connection and another position in which it releases the second switching means to cut off said electric connection with (2) a second control means shiftable between a position in which it actuates said first switching means to effect said electric connection and another position in which it releases said first switching means to cut off said electric connection, the first and second control means being arranged to move simultaneously or individually, the interlocking means being provided with first urging means which constantly urges said first control means toward its position in which it holds said second switching means in a state of cutting off said electric connection and with second urging means which constantly urges said second control means toward its position in which it holds said first switching means in a state of cutting off said electric connection; and
 (j) locking means which, against the urging force of said second urging means, selectively locks only said second control means in its position in which said first switching means is held in a state of effecting said electric connection.

10. A motion picture camera according to claim 9, wherein said information indicating means indicates a defining degree of a photographing light flux defining member which defines a photographing light flux passing through said photographing optical system.

11. A motion picture camera according to claim 9, wherein said information indicating means is provided with a lamp which indicates the film feeding status of said film feeding means.

12. A motion picture camera comprising:
 (a) a camera housing provided with a jack which permits connection of a plug from the outside of the camera housing;
 (b) an electric power supply circuit;
 (c) film feeding means driven by an electric current supplied from the electric power supply circuit for feeding film;
 (d) first switching means for making electric connection between the electric power supply circuit and the film feeding means, the electric connection being normally cut off;

(e) information indicating means for indicating the operating status of the camera;

(f) auxiliary information indicating means for enhancing the indicating effect of the information indicating means, the auxiliary information indicating means being operated by an electric current supplied from the electric power supply circuit;

(g) second switching means for making electric connection between the electric power supply circuit and the auxiliary information indicating means, the electric connection being normally cut off;

(h) release means for causing the first and second switching means to effect the electric connection respectively;

(i) locking means for selectively locking the release means in its state of having caused the first switching means to effect the electric connection and the second switching means to effect the electric connection; and (j) third switching means for nullifying, when said plug is inserted into the jack, the electric connection effected by the second switching means, the third switching means being connected to the electric power supply circuit in series with the second switching means.

13. A motion picture camera according to claim 12, wherein said auxiliary information indicating means is provided with illuminating means for illuminating an indicating part of said information indicating means.

14. A motion picture camera according to claim 12, wherein said information indicating means indicates information of an exposure stop value.

15. A motion picture camera according to claim 12, wherein said first and second switching means are provided with functions to urge said release means normally to hold the first and second switching means in their states of cutting off the electric connection to be effected by them respectively.

16. A motion picture camera according to claim 12, wherein said release means is provided with urging means for constantly urging the first and second switching means to be in their states of cutting off the electric connection to be effected by them respectively.

17. A motion picture camera of a TTL type comprising;
(a) a camera housing provided with a jack which permits connection of a plug from the outside of the camera housing;
(b) a photographing optical system disposed in the camera housing;
(c) a view finder optical system disposed in the camera housing;
(d) an electric power supply circuit;
(e) film feeding means driven by an electric current supplied from the electric power supply circuit for feeding film;
(f) first switching means for making electric connection between the electric power supply circuit and the film feeding means, the electric connection being normally cut off;
(g) information indicating means operated by an electric current supplied from the electric power supply circuit to shift a movable part thereof within the visual field of the view finder optical system according to the operating condition of the camera;
(h) illuminating means for enhancing the indicating effect of the information indicating means within the visual field of the view finder optical system by illuminating the movable part of the information indicating means, the illuminating means being operated by an electric current supplied from the electric power supply circuit;
(i) second switching means for making electric connection between the electric power supply circuit and the illuminating means, the electric connection being normally cut off;
(j) release means for causing the first and second switching means to effect the electric connection respectively;
(k) locking means for selectively locking the release means in its state of having caused the first and second switching means to effect the electric connection; and
(l) third switching means for nullifying, when said plug is inserted into the jack, the electric connection effected by the second switching means, the third switching means being connected to the electric power supply circuit in series with the second switching means.

18. A motion picture camera according to claim 17, wherein said information indicating means indicates a degree of defining by a photographing light flux defining member which defines a photographing light flux passing through the photographing optical system.

19. A motion picture camera system comprising:
(a) a camera housing;
(b) an electric power supply circuit;
(c) film feeding means driven by an electric current supplied from the electric power supply circuit;
(d) first switching means for making electric connection between the electric power supply circuit and the film feeding means, the electric connection being normally cut off;
(e) information indicating means for indicating the operating status of the camera;
(f) auxiliary information indicating means for enhancing the indicating effect of the information indicating means, the auxiliary information indicating means being operated by an electric current supplied from the electric power supply circuit;
(g) second switching means for making electric connection between the electric power supply circuit and the auxiliary information indicating means, the electric connection being normally cut off;
(h) release means for causing the first and second switching means to effect the electric connection respectively;
(i) locking means for selectively locking the release means in its state of having caused the first and second switching means to effect the electric connection to be made by them respectively; and
(j) third switching means which, in response to the locking action of the locking means, nullifies the electric connection effected by the second switching means, the third switching means being connected to the electric power supply circuit in series with the second switching means.

20. A motion picture camera of a TTL type comprising:
(a) a camera housing;
(b) a photographing optical system disposed in the camera housing;
(c) a view finder optical system disposed in the camera housing;
(d) an electric power supply circuit;

(e) film feeding means driven by an electric current supplied from the electric power supply circuit for feeding film;

(f) first switching means for making electric connection between the electric power supply circuit and the film feeding means, the electric connection being normally cut off;

(g) information indicating means operated by an electric current supplied from the electric power supply circuit to shift a movable part thereof within the visual field of the view finder optical system according to the operating condition of the camera;

(h) illuminating means for enhancing the indicating effect of the information indicating means within the visual field of the view finder optical system by illuminating the movable part of the information indicating means, the illuminating means being operated by an electric current supplied from the electric power supply circuit;

(i) second switching means for making electric connection between the electric power supply circuit and the illuminating means, the electric connection being normally cut off;

(j) release means for causing the first and second switching means to effect the electric connection respectively;

(k) locking means for selectively locking the release means in its state of having caused the first and second switching means to effect the electric connection to be effected by them respectively; and (l) third switching means which, in response to the locking action of the locking means, nullifies the electric connection effected by the second switching means, the third switching means being connected to the electric power supply circuit in series with the second switching means.

21. A motion picture camera according to claim 20, wherein said first and second switching means also urge said release means to normally hold the first and second switching means in their states of cutting off the electric connection to be effected by them.

* * * * *